Figure 1:
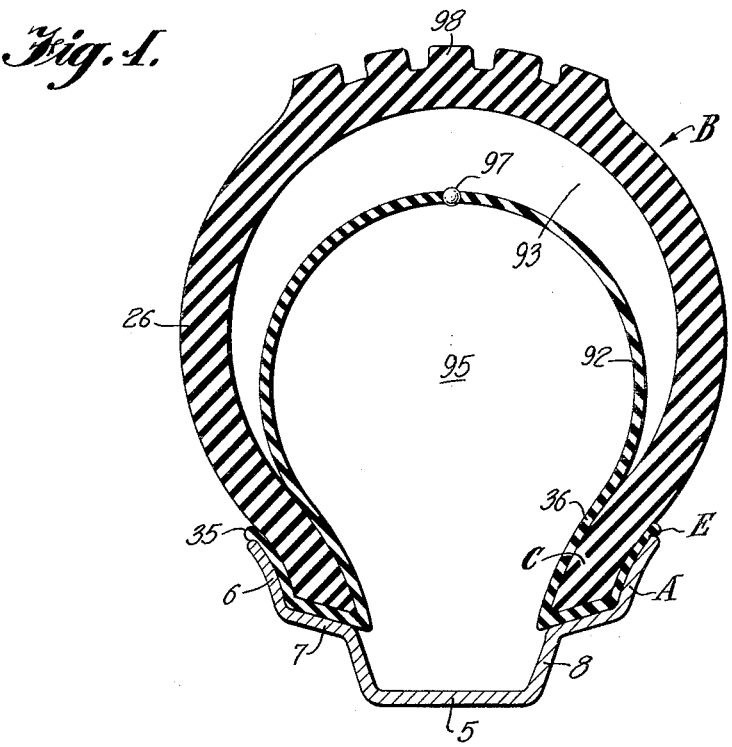

Aug. 25, 1964 R. N. SARRIS 3,145,754
PNEUMATIC TIRES AND TUBES
Original Filed Nov. 2, 1953

INVENTOR
R. N. Sarris
BY Mason, Fenwick & Lawrence
ATTORNEYS

United States Patent Office 3,145,754
Patented Aug. 25, 1964

3,145,754
PNEUMATIC TIRES AND TUBES
Rennos Nicolaou Sarris, 38 Blvd. Lefebre, Paris, France, assignor of one-third to James C. Gault, Antony, France
Continuation of application Ser. No. 547,199, Nov. 14, 1955, which is a division of application Ser. No. 389,819, Nov. 2, 1953. This application June 19, 1959, Ser. No. 821,573
Claims priority, application Great Britain Nov. 21, 1952
6 Claims. (Cl. 152—342)

The present invention relates to pneumatic tires, and is a continuation of application Serial Number 547,199, filed November 14, 1955, which in turn is a division of application Serial Number 389,819 filed November 2, 1953, both of which are now abandoned.

When it is desired to use a pneumatic tire casing for vehicles without a conventional inner tube, it is necessary to provide for sealing at the bead portions of the tire and in particular, it is necessary to provide effectively for preventing escape of air from within the casing to outside in the region between the tire bead portions and the rim of the wheel so that normal inflation pressure will be maintained within the casing under varying operating conditions. It is further desirable to avoid objectionable out-of-balance effects due to ruptures or punctures in the tire wall and in particular, to prevent sudden total collapse or gradual inflation resulting from ruptures or punctures in the wall of a tire in service. The attempts that have been made in the past to attain these ends, although many and varied, have not been fully satisfactory.

Among the objects of the present invention are, to provide means effectively whereby a pneumatic tire devoid of a conventional inner tube can normally be used upon a standard wheel rim; to provide for preventing leakage of air in the region between the bead portions of a tire and the supporting rim under normal operating conditions despite extreme deflections of the tire in high speed service; and to provide for avoiding gradual or sudden complete instability of a casing in the event of punctures or ruptures in the tire wall.

When a pneumatic tire is mounted upon a rim, it is usually necessary to provide tools to assist in the mounting operation so that the tire bead portions will pass over either rim flange along its entire periphery. I have found that in a mounting operation of this type, it is possible to interpose a relatively thin annulus between a tire bead portion and a supporting rim flange without impairing the ability of the bead portion totally to pass over the rim flange and that in passing over said flange, said bead portion does not offer an objectionably high resistance to the manipulation of the tools used in the mounting operation. Said annulus maintains an effective anchoring engagement upon the bead portion despite the coercing action of the tools and also despite extreme deflection of the tire in service so that, when the two bead portions of a tire are each provided with an annulus of this type and the tire thus provided is mounted upon a rim, an effective means is obtained under pressure against leakage of air from within the casing to atmosphere in the region between the tire bead portions and the rim.

According to the invention there is provided for a tubeless pneumatic tire a bead seating member comprising a flexible annulus which in radial section is of substantially U-shape and is adapted to fit upon the bead of a tire casing with one limb of the section inside the said casing and the other upon the outside thereof so as to be squeezed between the outwardly facing surface of said bead and the usual rim flange of the wheel. Preferably the seating member incorporates reinforcement in the form of metal portions which are also of U-shape in radial section and are arranged to resiliently urge the limbs of the seating member towards one another for the purpose of gripping the wall of the tire adjacent the bead.

There is further provided according to the invention a bead seating unit comprising a pair of such seating members, and an annular belt which is C-shaped in radial section, with its marginal edges merging respectively into the inner limbs of the two seating members.

The invention is illustrated in the accompanying drawings which show, merely by way of example, embodiments of the invention.

Figure 2:
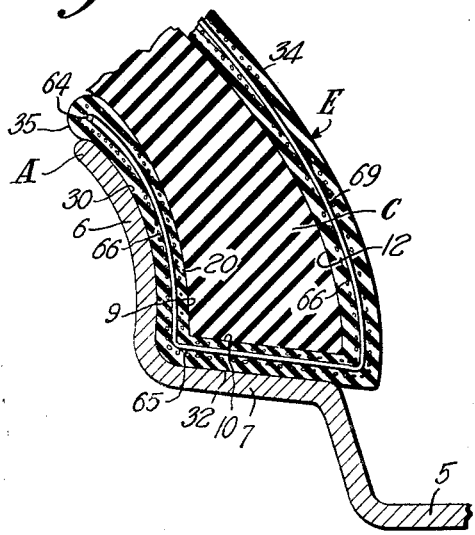

In the drawings:
FIGURE 1 is a cross-section showing a pneumatic tire mounted upon a rim without inflation valve, two annular seating members being interposed between the tire bead portions and the rim and extended by a partition wall in accordance with and embodying the invention;
FIGURE 2 is a fragmentary enlarged detail view of one corner of FIGURE 1 showing one bead of a tire with adjacent parts of a rim and the seating member and extended partition wall of the present invention; and
FIGURE 3 is a cross-section on an enlarged scale showing a seating member.

Although the invention is advantageous where it is desired to use any currently standard type of rim, FIGURE 1 shows one existing type of automobile rim A which may be of the so-called drop centre type having a base 5, top-side flanges 6, 6, bead-seating flanges 7, 7 and base-side flanges 8, 8. Said rim is shown in FIGURE 1 as mounted with a pneumatic tire casing B of the ordinary type terminating in the usual bead portions C, C having, as illustrated in FIGURE 2, axial outer faces 9, 9, rim-seating faces 10, 10 and axial inner faces 12, 12. Two identical pincer-like seating members E, E extending in a circumferentially continuous manner grip at the axial outer faces, the rim-seating faces and the axial inner faces of the bead portions and are anchored thereto so as to sufficiently resist, yet not completely frustrate, any reasonable attempt to remove them from the bead portions by hand.

Figure 3:
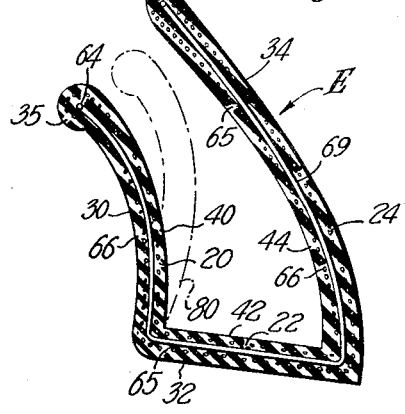

FIGURE 3 illustrates in cross section more in detail the three sides of one seating member having an outer arm 20 connected by a base portion 22 with an inner arm 24; said outer arm terminating in an outer edge 35 and having an outer face 30 and an inner face 40; said base 22 having an outer face 32 and an inner face 42; and said inner arm terminating in an inner edge 36 and having an outer face 34 and an inner face 44.

Although the thickness of the members is shown in cross section in the drawings equal on all three sides, the inner arms may, if desired, be thicker than the outer arms and/or the base portions of the members, while the outer arms may be thicker than the base portions of the members and in order not to obstruct in the operation of mounting the casing upon the rim, the thickness of the outer arms and of the base portions of the members may be as low as is consistent with long and satisfactory service.

Although the seating members E, E may be made to assume any desired shape, it is preferred that said members be substantially U-shaped as better illustrated in cross section in FIGURE 3 so that each seating member will grip effectively at the allotted tire bead portion, thereby preventing the possibility of their being dislocated from the bead portions when the tire is mounted upon the rim. Owing to their gripping engagement upon the bead portions on one hand and their rim engaging location on the other, said seating members, when interposed between the tire bead portions and the rim, provide effectively a seal against leakage of air from within the casing to outside past the bead portion of the tire in use. More particularly, the air pumped into the tire at the beginning of the inflated operation is prevented from escaping to atmosphere in the same rate as it is received into the casing and, as the inflated operation continues and the inflation pressure within the casing increases, not only the gripping hold of the members upon the bead portions is enhanced but the axial outer arms and the base portions of the seating members, under pressure from within the casing, are firmly pressed against the rim thereby providing a sealing engagement in a continuous manner circumferentially of the tire; this sealing engagement is effectively maintained even under the most rigorous operating conditions despite extreme deflections of the tire in high speed service.

While the seating members may be of rubber or other rubber-like material alone, one mode of construction of the members is illustrated by way of example in FIGURE 3, in which 65 is a layer of rubber or other rubber-like material in which may be embedded one or more plies 66, 66 of any flexible reinforcing material such as woven cord fabric of cotton, nylon, rayon or the like extending circumferentially, radially and axially about the seating members. One or more plies of reinforcing metal 69, also extending along the entire periphery of each member from outer edge 35 to inner edge 36, as shown, are encased in the layer 65 and, if preferred, bonded thereto so that the seating members will be reinforced additionally not only to allow longer periods of service despite the injuries that their outer faces 30, 30, 32, 32 may sustain by the tools used in mounting and demounting the casing upon and from the rim, but to provide also for maintaining the gripping engagement of the seating members upon the bead portions circumferentially, radially and axially of the tire.

If desired, said lining layer may be omitted from the inner faces of the members so that the outer faces and the rim-seating faces of the bead portions will come into direct contact with the reinforcing metal and further, so that the top-side flanges and the bead-seating flanges of the rim as well as the axial inner faces of the tire bead portions will engage said lining layer 30, 32, 34 and 44 without coming into direct contact with the reinforcing metal. This provision is also advantageous because the thickness of the outer arms and of the bases of the seating members is reduced additionally while the lining layer provided upon the inner faces 44, 44 assists in preventing dislocation of the members from the bead portions when the tire is mounted upon the rim.

In FIGURE 3 two flexible plies are illustrated as being embedded in layer 65 and one metal ply as being encased between two flexible plies, although the number of plies and the material as well as the thickness and the mutual position thereof, as also the thickness of the layer 65, may be varied as desired.

Before the vulcanizing operation, the reinforcing metal may be in the form of a plurality of closely-spaced wire strips each of a length corresponding to the overall axial and radial measurements of each seating member from outer edge 35 to inner edge 36, as shown in FIGURE 3, or, if preferred, in the form of spaced-apart arcuate sheets, said strips or sheets being substantially U-shaped to conform with the shape of the members after vulcanization and held together at edges 35, 36 by wire rings 64, 64. If desired, the reinforcing metal may be held together by small metal joints at regular intervals, said rings being formed to assume a collective circumferential U-shape conforming with the shape of the members after vulcanization.

When the members are subjected to the vulcanizing operation, the axial outer arms are preferably formed to bend inwardly in the direction of the inner arms as shown by broken lines 80 in FIGURE 3 so that the ability of the members to grip at the bead portions will be strengthened additionally in such manner effectively as not only to withstand the coercing action of the tools used in mounting the casing upon the rim but to maintain the tight fit of the members upon the bead portions circumferentially, radially and axially of the tire under extreme deflections of the tire in operation.

Although part of the seating members E, E and part of the tire bead portions are illustrated in FIGURE 1 so as to project or overhang the bead-seating flanges of the rim, the tire casing may, if desired, be moulded as provided with bead portions reduced in thickness in the region of the axial outer faces and/or the axial inner faces of said bead portions, the axial length of the bases 22, 22 of the members being correspondingly reduced, so that when the members are fitted on to the tire bead portions, the rim-seating faces of the bead portions and the bases 22, 22 of the members will be approximately equal in axial length as the bead-seating flanges 7 of the rim.

Provision is made for preventing gradual or sudden total collapse of the casing in the event of a puncture or rupture in the tire wall in that the inner arms of the seating members are extended and joined integrally together in a circumferentially continuous manner so as to form a substantially inextensible partition wall shown at 92 in FIGURE 1, said partition wall dividing the tire fluid space into two air-tight compartments intercommunicating, if desired, through a valve 97, of known type, so that the air in the course of the tire inflating operation will pass from the inner compartment 95 through valve 97 to the outer compartment 93 until the tire has reached its normal inflation pressure point. Said valve 97 may be adapted to be actuated under a pressure differential so that when, as a result of a rupture in the tire wall entailing loss of air from within the belt to outside, and the inflation pressure within the outer compartment 93 falls below a predetermined amount, said valve 97 will close and thus assist the inner compartment to sustain the load of the vehicle sufficiently to allow said vehicle to come to a safe stop. Said partition wall may be of rubber or other rubber-like material in which may be embedded one or more plies of any flexible material such as woven cord fabric of cotton, nylon, rayon or the like, and, if preferred, one or more plies of reinforcing metal so as to make it substantially inextensible as hereinbefore described. Said rubber or other rubber-like material of the partition wall may be adhesively compatible with the layer 65 so that, if preferred, one edge of said partition wall will be secured to the axially inner arm of one member and adhered thereto, as shown in FIGURE 1, and the other edge of said partition wall will be secured to the axially inner arm of the other member and adhered thereto, the seating members and the partition wall being formed into an integral unit when vulcanized.

To permit inflation or deflation of the casing as may be required, a separable conventional inflation valve may be passed through the usual valve opening of the rim and secured by two rubber washers. When it is desired to inflate a pneumatic tire as contemplated by the present invention, the partition wall may be introduced into the casing, the members may then be fitted on to the bead portions by hand while the inflation valve may next be passed through the valve opening of the rim and secured with the aid of the washers and the nut whereupon the casing becomes ready for inflation after being mounted upon the rim in the usual way. To provide for easier handling of the seating members, their outer edges may be moulded as provided with bulbs or beads as shown, extending circumferentially of the tire.

What is claimed is:

1. In a pneumatic type of tubeless tire, a tire casing to fit on the rim of a wheel and having beads to be mounted upon the bead seats and at the side flanges of said rim, a separable annular partition member dividing the space within said tire casing into a plurality of compartments and comprising U-shaped bead-seating members merging into the marginal annular ends of said partition member to closely receive the beads of said tire casing, said bead-seating members having resilient metallic reinforcing members embedded therein extending substantially radially of said tire casing to exert a gripping action on said tire casing beads, and comprising wire rings embedded at the extremity of each of said U-shaped bead-seating members, said rings being fastened to said metallic reinforcing members to provide an integral reinforcing structure.

2. In a pneumatic type of tubeless tire, a tire casing to fit on the rim of a wheel and having beads to be mounted upon the bead seats and at the side flanges of said rim, a separable annular partition member dividing the space within said tire casing into a plurality of compartments and comprising bead-seating members on the marginal annular ends of said partition member, means within said bead-seating members for reinforcing the same and having a cross-section which is similar in configuration to but smaller than the cross-section of said tire casing beads, said reinforcing means being resilient so as to exert a positive gripping action on both the inner and outer surfaces of said beads to retain said partition member in place, said bead-seating members being detachable from said beads.

3. In a pneumatic type of tubeless tire, a partition member as claimed in claim 2 in which said partition member is substantially inextensible radially, axially and circumferentially thereof.

4. In a pneumatic type of tubeless tire, a tire casing to fit on the rim of a wheel and having beads to be mounted upon the bead seats and at the side flanges of said rim, a separable annular partition member dividing the space within said tire casing into a plurality of compartments and comprising bead-seating members on the marginal annular ends of said partition member, means within said bead-seating members for reinforcing the same and having a cross-section which is similar in configuration to but smaller than the cross-section of said tire casing beads, said reinforcing means being resilient so as to exert a positive gripping action on both the inner and outer surfaces of said beads to retain said partition member in place while permitting said seating members to be detachable from said beads, and a differential pressure valve in said annular partition to maintain a predetermined air pressure within an inner compartment in the event that the pressure in an outer compartment formed by said partition member falls below a predetermined amount.

5. A flexible circumferentially continuous endless annulus for use in combination with a pneumatic tire casing and a wheel rim; said tire casing having a tire inner wall with two annular tire beads on the ends thereof; each of said tire beads having a generally radially extending outer surface, a generally radially extending inner surface, and a generally axially extending seating surface; said rim having two generally radially extending tire bead holding flanges and two generally axially extending tire bead seating flanges; said annulus integrally comprising two annular circumferentially continuous endless resilient channel-shaped members; said members being adapted to be detachably mounted upon said tire beads and having resilient metallic reinforcement embedded therein whereby to exert a positive gripping action on both said outer surface and said inner surface of each of said tire beads when mounted thereon; each of said members comprising a generally radially bent outer leg, a generally radially bent inner leg longer than said outer leg and a generally axially extending base portion integrally connecting said outer leg with said inner leg throughout the circumferential extent thereof so that said outer legs of the channel shaped members can be compressed by and between said outer surfaces of the tire beads and said tire bead holding flanges of the rim and also so that said base portion can be compressed by and between said seating surfaces of the tire beads and said tire bead seating flanges of the rim to eliminate direct contact of said tire beads with said rim; said inner legs being curvingly extended generally radially and joined integrally together throughout their circumferential extent to form said annulus for use as a unitary separable partition peripherally dividing the space within said casing into two airtight chambers retaining inflation air when in operation, the one of said chambers being formed by and between said partition and said rim and the other of said chambers being formed by and between said partition and said tire inner wall.

6. A flexible circumferentially continuous endless annulus for use in combination with a pneumatic tire casing and a wheel rim; said tire casing having a tire inner wall with two annular tire beads on the ends thereof; each of said tire beads having a generally radially extending outer surface, a generally radially extending inner surface, and a generally axially extending seating surface; said rim having two generally radially extending tire bead holding flanges and two generally axially extending tire bead seating flanges; said annulus integrally comprising two annular circumferentially continuous endless resilient channel-shaped members; said members being adapted to be detachably mounted upon said tire beads; means within each of said members for reinforcing the same, said means having in the unflexed condition of said members a cross-section similar in configuration to but smaller than the cross-section of each of said tire beads whereby to exert a positive gripping action on both said outer surface and said inner surface of each of said tire beads when said members are mounted thereon; each of said members comprising a generally radially bent outer leg, a generally radially bent inner leg longer than said outer leg and a generally axially extending base portion integrally connecting said outer leg with said inner leg throughout the circumferential extent thereof so that said outer leg can be compressed by and between each of said outer surfaces of the tire beads and each of said tire bead holding flanges of the rim and also so that said base portion can be compressed by and between each of said seating surfaces of the tire beads and each of said tire bead seating flanges of the rim to eliminate direct contact of said tire beads with said rim; said inner legs being curvingly extended generally radially and joined integrally together throughout their circumferential extent to form said annulus for use as a unitary separable partition peripherally dividing the space within said casing into two airtight chambers retaining inflation air when in operation, the one of said chambers being formed by and between said partition and said rim and the other of said chambers being formed by and between said partition and said tire inner wall.

References Cited in the file of this patent
UNITED STATES PATENTS

| | | |
|---|---|---|
| 2,244,941 | Degnon | June 10, 1941 |
| 2,501,372 | Benson | Mar. 21, 1950 |
| 2,680,463 | Khalil | June 8, 1954 |
| 2,698,042 | Perkins | Dec. 28, 1954 |
| 2,756,800 | Riggs | July 31, 1956 |
| 2,811,189 | Howard | Oct. 29, 1957 |
| 2,853,115 | Church | Sept. 23, 1958 |